United States Patent
Borroni-Bird et al.

(10) Patent No.: US 7,597,169 B2
(45) Date of Patent: Oct. 6, 2009

(54) WHEEL MODULE

(75) Inventors: Christopher E. Borroni-Bird, Oakland Township, MI (US); Adrian B. Chernoff, Royal Oak, MI (US); Mohsen D. Shabana, Ann Arbor, MI (US); Robert Louis Vitale, Macomb Township, MI (US); Bruce Edward Zemke, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1397 days.

(21) Appl. No.: 10/309,786

(22) Filed: Dec. 4, 2002

(65) Prior Publication Data

US 2003/0132584 A1    Jul. 17, 2003

Related U.S. Application Data

(60) Provisional application No. 60/337,994, filed on Dec. 7, 2001.

(51) Int. Cl.
*B60K 7/00* (2006.01)
(52) U.S. Cl. .................................. 180/253; 280/124.1
(58) Field of Classification Search ................ 180/65.1, 180/65.2, 65.5, 242, 252, 253; 280/5.5, 124.1, 280/80.1
See application file for complete search history.

(56) References Cited

U.S. PATENT DOCUMENTS

| | | | |
|---|---|---|---|
| 4,165,794 A | 8/1979 | Warner et al. | |
| 4,216,839 A | 8/1980 | Gould et al. | |
| 4,363,999 A | 12/1982 | Preikschat | |
| 4,913,258 A * | 4/1990 | Sakurai et al. | 180/242 |
| 4,923,209 A | 5/1990 | Armbrust et al. | 280/689 |
| 4,997,201 A | 3/1991 | Schaible | 280/668 |
| 5,058,016 A | 10/1991 | Davidovitch | |
| 5,150,763 A * | 9/1992 | Yamashita et al. | 180/252 |
| 5,418,437 A | 5/1995 | Couture et al. | |
| 6,097,286 A | 8/2000 | Discenzo | |
| 6,102,151 A | 8/2000 | Shimizu et al. | |
| 6,367,830 B1 | 4/2002 | Annequin et al. | 280/93.512 |
| 6,386,553 B2 * | 5/2002 | Zetterstrom | 280/5.51 |
| 6,424,900 B2 * | 7/2002 | Murray et al. | 701/48 |
| 6,732,827 B2 * | 5/2004 | San Miguel | 180/242 |
| 2002/0023791 A1 * | 2/2002 | Kima et al. | 180/65.5 |
| 2004/0112657 A1 * | 6/2004 | Ajiro et al. | 180/65.5 |

FOREIGN PATENT DOCUMENTS

WO      WO 00/38939      *    7/2000

OTHER PUBLICATIONS

Stuart Birch, "Stick or Non-Stick," Automotive Engineering International On Line, Mar. 2000.
Sanket Amberkar, et al., "A System-Safety Process for by-Wire Automotive Systems", SAE Technical Paper, 2000-01-1056, SAE World Congress, Detroit, MI, Mar. 2000.
Edmunds.com Editors, "Why Drive-by-Wire?", The New York Times, Nov. 29, 2000.

* cited by examiner

*Primary Examiner*—Anne Marie Boehler

(57) ABSTRACT

A wheel module is configured for use on a vehicle chassis. A drivable vehicle includes a wheel module operatively connected to a vehicle chassis. The wheel module includes at least one non-rotating structural unit, a rotatable wheel controllably connected to the structural unit, a vehicle attachment interface operatively connected to the non-rotating structural unit including a load-bearing vehicle retention coupling and a control signal receiver. The wheel module further includes chassis components including at least one of a brake system, steering system, motor and suspension system operatively connected to the non-rotating structural unit and to the wheel, and operatively connected to the control signal receiver for controlling the wheel in response to non-mechanical control signals received through the control signal receiver.

9 Claims, 5 Drawing Sheets

WHEEL MODULE

CROSS-REFERENCE TO RELATED APPLICATIONS

This application claims the benefit of U.S. Provisional Application 60/337,994 filed Dec. 7, 2001, which is hereby incorporated by reference in its entirety.

TECHNICAL FIELD

This invention relates to wheel modules for use on vehicles.

BACKGROUND OF THE INVENTION

The vehicle manufacturing industry is continually pursuing efficient component parts and assembly procedures that would increase the ease of connectivity and the interchangeability of component parts. Using by-wire control technology in lieu of mechanical linkages to attach component parts to a vehicle chassis increases efficiency by conceivably reducing the number and complexity of connection components. A number of variations occur with respect to vehicle systems integral to a vehicle wheel including braking, steering, suspension and the use of wheel motors. Standardizing and minimizing connection components for wheels having different combinations of these systems may achieve increased assembly efficiency and adaptability.

SUMMARY OF THE INVENTION

A wheel module includes at least one non-rotating structural unit, a rotatable wheel controllably connected to the non-rotating structural unit, and a vehicle attachment interface that includes a load-bearing vehicle retention coupling and a control signal receiver and that is operatively connected to the non-rotating structural unit. In one embodiment, the wheel module is operably connectable to a vehicle chassis by only the vehicle attachment interface. The wheel module further includes chassis components including at least one of a brake system, steering system, motor and suspension system operatively connected to the non-rotating structural unit and to the wheel, and operatively connected to the control signal receiver for controlling the wheel in response to non-mechanical control signals received through the control signal receiver. Although referred to as a system, the brake system, steering system and suspension system may each include only one functional component, i.e., the term "system" as used herein may include only one component of the respective system. Furthermore, a wheel module may include more than one non-rotating structural unit in which case elements of the wheel module that must be operatively connected to a non-rotating structural unit may be operatively connected to any or all of the non-rotating structural units.

In one embodiment, the wheel module includes a sensor that is operatively connected to the wheel or a chassis component, and is capable of sensing at least one component condition. The vehicle attachment interface includes a sensor connector operatively connected to the sensor.

One embodiment of the wheel module includes an actuator operatively connected to the chassis components and to the control signal receiver and configured to convert an electrical control signal into a mechanical force that acts on the chassis components. In one embodiment, the actuator is operatively connected to the non-rotating structural unit.

A drivable vehicle includes the wheel module described above and a vehicle chassis. The vehicle chassis includes a frame, and at least one control unit operably connectable to the chassis components on the wheel module. The vehicle chassis also includes a wheel module attachment interface including a control signal connector port and a load-bearing vehicle retention coupling operatively connected to the frame. The control unit is operatively connected to the control signal connector port. The control signal receiver on the vehicle attachment interface is operatively connected to the control signal connector port on the wheel module attachment interface such that the control unit is communicable with and controls the chassis components on the wheel module. The load-bearing vehicle retention coupling is operatively connected to the load-bearing wheel module retention coupling. In one embodiment, the wheel module is operatively connected to the vehicle chassis by only the vehicle attachment interface and the wheel module attachment interface.

A method of manufacturing a drivable vehicle includes attaching the vehicle chassis described above to the wheel module described above by operatively connecting the control signal receiver with the control signal connector port such that said at least one control unit is communicable with and controls the chassis components, and operatively connecting the load-bearing vehicle retention coupling with the load-bearing wheel module retention coupling such that the wheel module bears vehicle loads.

Another method of manufacturing a drivable vehicle includes maintaining an inventory of wheel modules described above, including wheel modules of a first type and wheel modules of a second type, assembling a first drivable vehicle using a wheel module of a first type and assembling a second drivable vehicle using a wheel module of a second type. The wheel module of the first type includes chassis components that are configured to provide a different function than the chassis components of the wheel module of the second type.

The above objects, features and advantages, and other objects, features, and advantages, of the present invention are readily apparent from the following detailed description of the best mode for carrying out the invention when taken in connection with the accompanying drawings.

DESCRIPTION OF THE PREFERRED EMBODIMENTS

Figure 1:
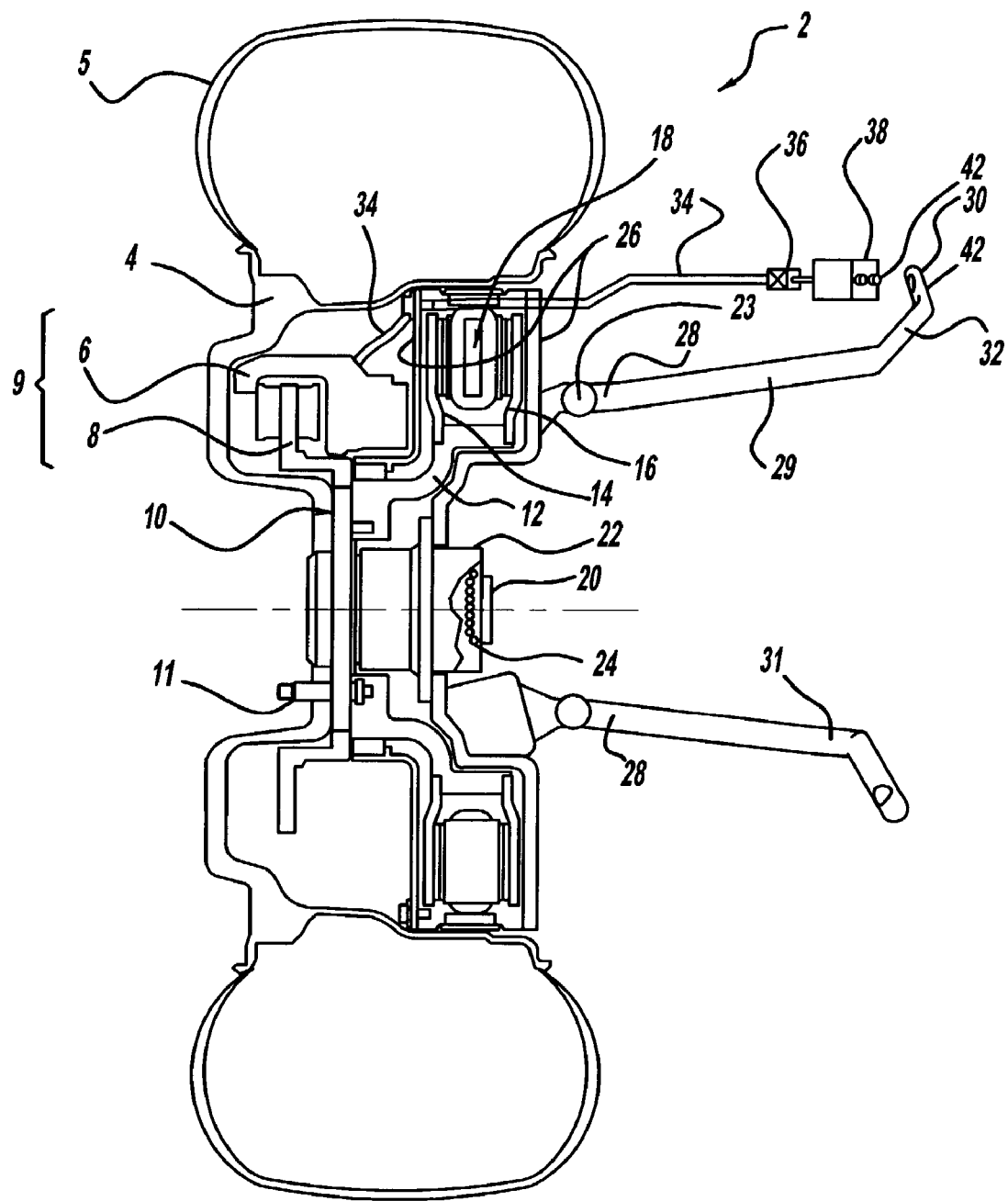
FIG. 1 is a schematic vertical cross-sectional view of one embodiment of a wheel module including a brake system, a steering system, a motor and a suspension system.

Referring to FIG. 1, a wheel module 2 in accordance with the invention includes a wheel 4. A tire 5 is shown fixed to the rim of the wheel 4. A stationary brake caliper 6 is shown fixed to a stationary motor housing 26. In this embodiment, the motor housing 26 is a non-rotating structural unit. The brake caliper 6 is operably connectable to a brake disc 8. The brake caliper 6 and brake disc 8 together comprise a brake system 9. The brake disc 8 is operatively connected to a hub 10. The hub 10 is affixed to the wheel 4 by use of a bolt 11. A rotor unit 12 including rotor discs 14, 16 is rigidly mounted to the hub 10. A stator 18 is shown operatively connected to the motor housing 26. A shaft housing 22 is rigidly connected to the motor housing 26. A shaft 20 is operatively connected to the wheel 4, and located inside of the shaft housing 22. A bearing 24 is located in the shaft housing. An electrical input to the stator 18 drives the rotor unit 12. The rotor 12 thereby drives the hub 10, the wheel 4 and the brake disc 8. Thus, the wheel 4 and the brake disc 8 are rotatable and are operatively connected to the motor housing 26.

A suspension system 28 is operatively connected to the motor housing 26. The suspension system 28 includes an upper suspension arm 29 and a lower suspension arm 31. A suspension link attachment 30 is shown at one end of the upper suspension arm 29. The upper suspension arm 29 is pivotably mounted with respect to the motor housing 26 by a suspension system wheel attachment 23. The suspension link 30 is used for attaching the wheel module 2 to a vehicle chassis. The suspension link 30 is also referred to herein as a load-bearing vehicle retention coupling 32. The load-bearing vehicle retention coupling 32 is designed to bear vehicle loading when attached to a vehicle.

A brake hydraulic line 34 is shown operatively connected to the brake caliper 6. The brake hydraulic line 34 passes through the motor housing 26 and is operatively connected to a brake actuator 36. The brake actuator 36 is operatively connected to a control signal receiver 38. The control signal receiver is thus operatively connected to the motor housing 26. The brake actuator 36 is designed to apply a mechanical (hydraulic) force to the brake caliper 6 in response to an electrical control signal sent by the control signal receiver 38. A vehicle attachment interface 42 on this wheel module 2 includes the control signal receiver 38 and the load-bearing vehicle retention coupling 32. The vehicle attachment interface 42 is thus operatively connected to the motor housing 26.

Figure 2:
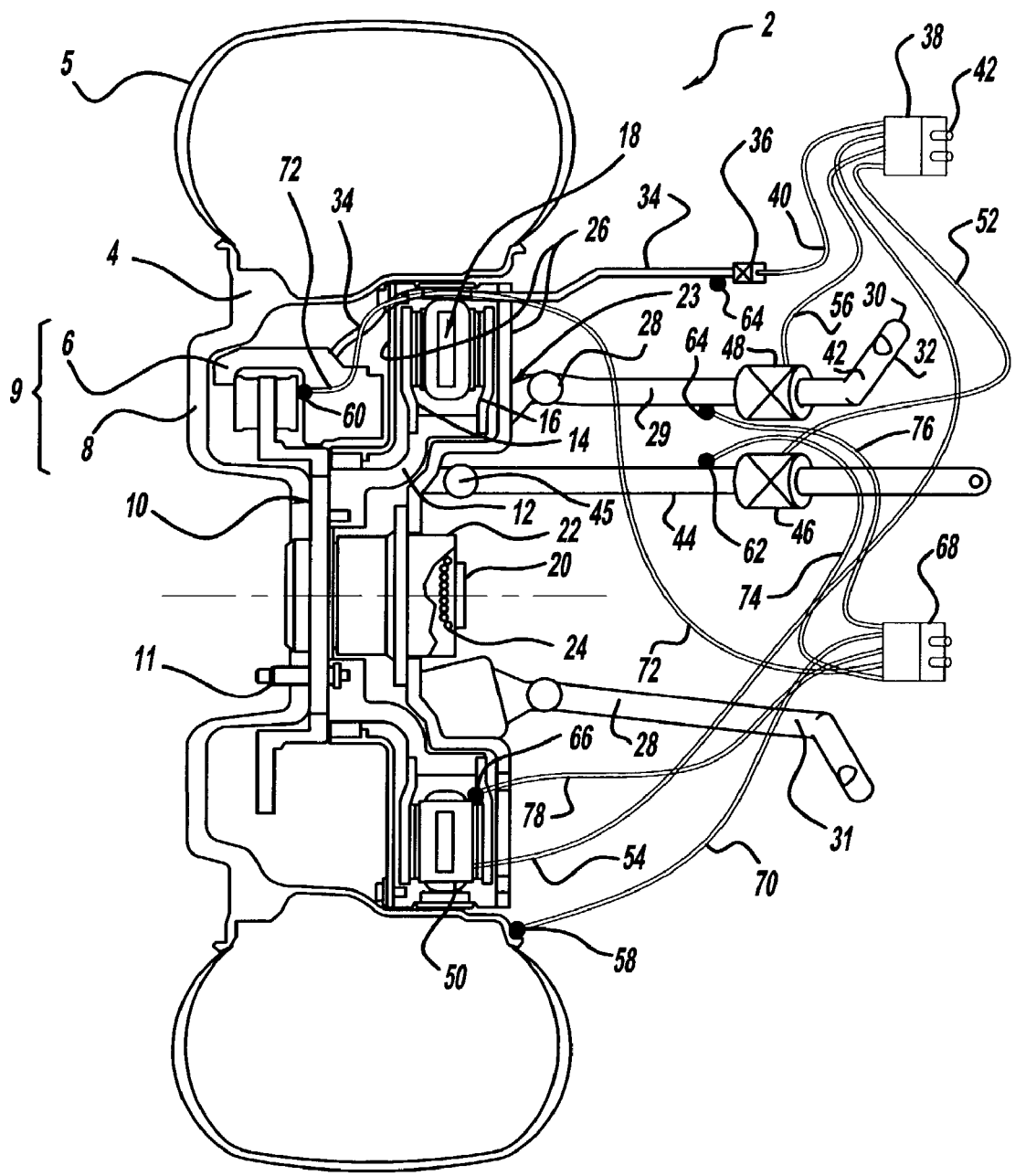
FIG. 2 is a schematic vertical cross-sectional view of an alternative embodiment of a wheel module including sensors and a sensor connector.

Referring to FIG. 2, wherein like reference numbers refer to like components from FIG. 1, an alternative embodiment of a wheel module 2 further includes a steering system 44 pivotably mounted to the motor housing 26 at a pivot wheel attachment 45. The steering system 44 is operatively connected to a steering system actuator 46. The suspension system 28 is operatively connected to a suspension system actuator 48. As in FIG. 1, the brake caliper 6 is operatively connected to the brake actuator 36. The brake actuator 36, steering system actuator 46 and suspension system actuator 48 are operatively connected to a control signal receiver 38 by a brake system connector wire 40, a steering system actuator wire 52 and a suspension system connector wire 56, respectively. The steering system actuator 46 is designed to apply mechanical force to the steering system 44 in response to an electrical control signal input sent from the control signal receiver 38 through the steering system actuator wire 52, thus steering the wheel module 2. The suspension system actuator 48 is designed to apply mechanical force to the suspension system 28 in response to an electrical control signal input sent from the control signal receiver 38 through the suspension connector wire 56.

The wheel module depicted in FIG. 2 includes a motor 50. The motor 50 is operatively connected to the motor housing 26 and is-operatively connected to the wheel 4. A motor connector wire 54 operatively connects the motor 50 to the control signal receiver 38. The motor 50 is designed to respond to an electrical signal sent from the control signal receiver 38 through the motor connector wire 54.

The wheel 4 is controllably connected to the motor housing 26 which is a non-rotating structural unit. As used herein, "controllably connected" means having the characteristic of being controllable. The wheel 4, when connected to the motor housing 26, is controllable by the brake system 9, the steering system 44, the suspension system 28, and the motor 50.

The wheel module depicted in FIG. 2 further includes a wheel sensor 58 operatively connected to the wheel 4, a brake system sensor 60 operatively connected to the brake caliper 6, a steering system sensor 62 operatively connected to the steering system 44, a suspension system sensor 64 operatively connected to the suspension system 48, and a motor sensor 66 operatively connected to the motor 50. The wheel sensor 58 is capable of sensing some wheel component condition such as wheel speed. The brake system sensor 60 is capable of sensing some brake system component condition such as brake caliper force. The steering system sensor 62 is capable of sensing some steering component condition, such as wheel angle. The suspension system sensor is capable of sensing some suspension component condition such as stress on the upper suspension arm 29. The motor sensor 58 is capable of sensing some motor condition such as temperature.

The wheel sensor 58 is operatively connected to a sensor connector 68 by a sensor connector wire 70. The brake system sensor 60 is operatively connected to the sensor connector 68 by a brake sensor wire 72. The steering system sensor is operatively connected to the sensor connector 68 by a steering system sensor wire 74. The suspension system 48 is operatively connected to the sensor connector 68 by a suspension system sensor wire 76. The motor 50 is operatively connected to the sensor connector 68 by a motor sensor wire 78. Thus, component conditions may be relayed to the sensor connector 68 by each of said sensors 58, 60, 62, 64, 66 via the corresponding sensor wires 70, 72, 74, 76, 78.

Figure 3:
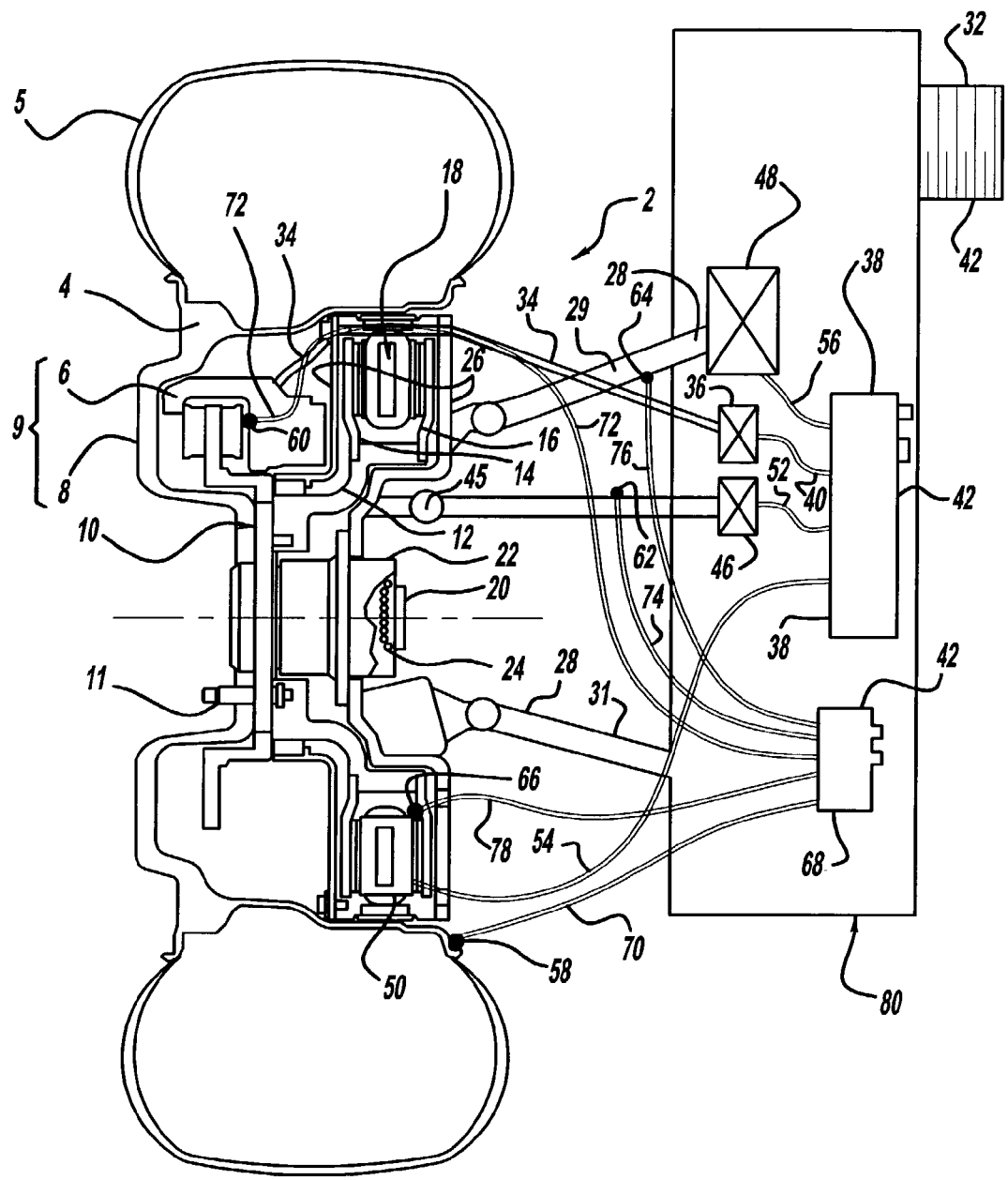
FIG. 3 is a schematic vertical cross-sectional view of a second alternative embodiment of a wheel module including two nonrotatable structural units.

Referring to FIG. 3, wherein like reference numbers refer to like components from FIGS. 1 and 2, a second alternative embodiment is depicted wherein the wheel module is operatively connected to a second stationary structural unit 80. In this embodiment, the control signal receiver 38, the sensor connector 68, the brake system actuator 36, the steering system actuator 46 and the suspension system actuator 48 are operatively connected to the second stationary structural unit 80. Furthermore, the load bearing vehicle retention coupling 32 is operatively connected to the second stationary structural unit 80. The second stationary structural unit 80 may be rigidly fixed to a vehicle chassis. Thus, this configuration may result in lower unsprung mass as the mass of the control signal receiver 38, the sensor connector 68, and the actuators 36, 46, 48 is located axially inward of the suspension system 48.

Figure 4:
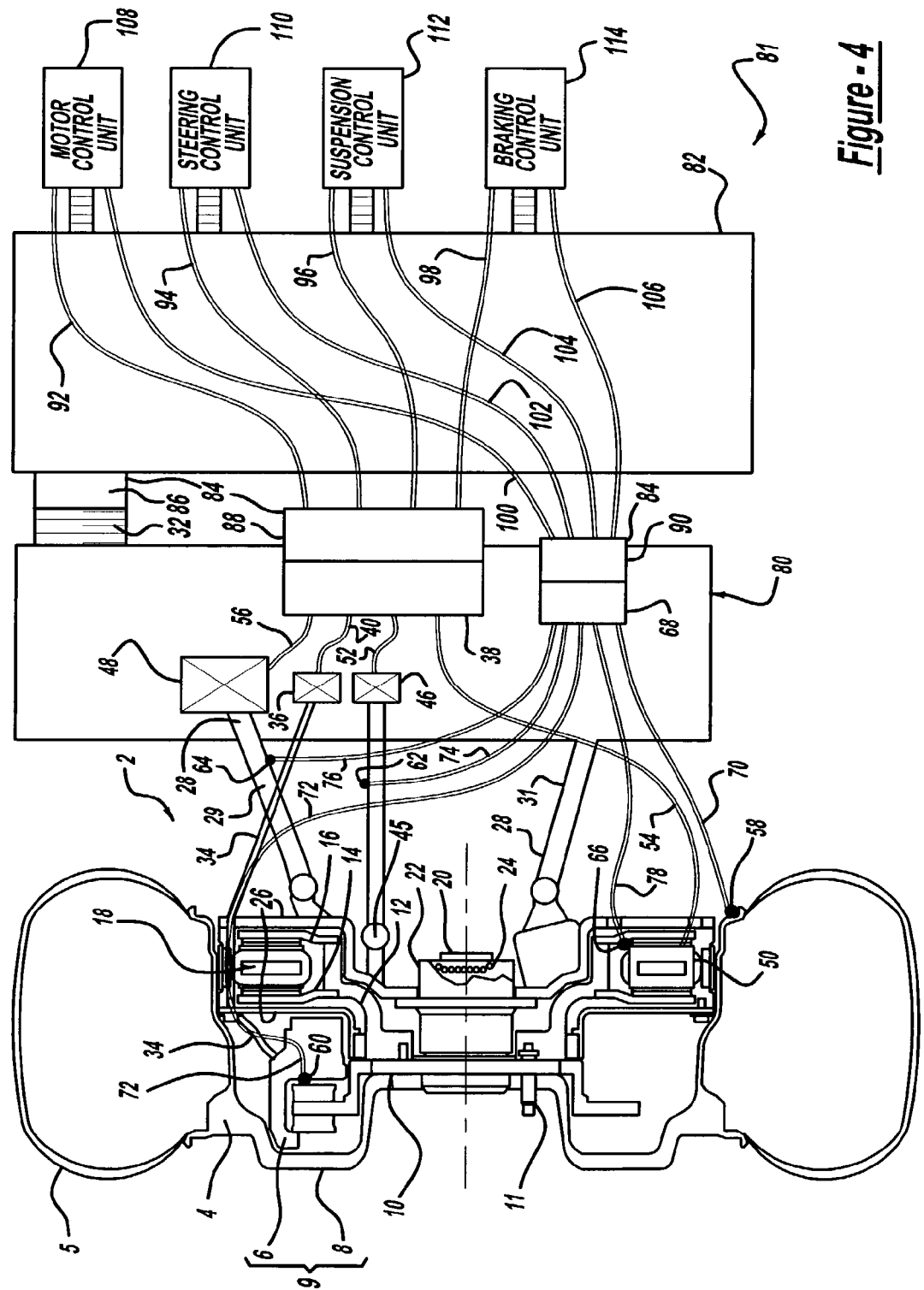
FIG. 4 is a schematic vertical cross-sectional view of a drivable vehicle comprising the wheel module of FIG. 3 and a vehicle chassis.

Referring to FIG. 4, wherein like reference numbers refer to like components from FIGS. 1-3, the wheel module 2 and second structural unit 80 of FIG. 3 are depicted as operatively connected to a vehicle chassis 81. The second structural unit 80 is represented schematically as a beam, but could be a variety of shapes, including a panel formed to complement the outer contours of the vehicle chassis 81. The chassis 81 includes a frame 82, a motor control unit 108, a steering control unit 110, a suspension control unit 112 and a braking control unit 114, each of which is operatively connected to the frame 82. The chassis 81 further includes a wheel module attachment interface 84 which includes a wheel module retention coupling 86, a control signal connector port 88, and a sensor connector port 90. The motor control unit 108, the steering control unit 110, the suspension control unit 112 and the braking control unit 114 are operatively connected to the control signal connector port 88 by a motor control unit connector wire 92, a steering control unit connector wire 94, a suspension control unit connector wire 96 and a braking control unit connector wire 98, respectively. The control signal connector port 88 is operatively connected to the control signal receiver 38.

Accordingly, the motor control unit 108 may transmit a control signal to the motor 50 through the motor control unit connector wire 92, the control signal connector port 88, the control signal receiver 38 and the motor connector wire 54. The braking control unit 114 may transmit a control signal to the brake system 9 through the braking control unit connector wire 98, the control signal connector port 88, the control signal receiver 38, the brake system connector wire 40 and the brake system actuator 36 and the brake system hydraulic line 34. The steering control unit 110 may transmit a control signal to the steering system 44 through the steering control unit connector wire 94, the control signal connector port 88, the control signal receiver 38, the steering system actuator wire 52 and the steering system actuator 46. The suspension control unit 112 may transmit a control signal to the suspension system 28 through the suspension control unit connector wire 96, the control signal connector port 88, the control signal receiver 38, the suspension system connector wire 56 and the suspension system actuator wire 48.

The motor control unit 108, the steering control unit 110, the suspension control unit 112 and the braking control unit 114 are operatively connected to a sensor connector port 90 by a motor control unit sensor connector port wire 100, a steering control unit sensor connector port wire 102, a suspension control unit sensor connector port wire 104 and a braking control unit sensor connector port wire 106, respectively. The sensor connector port 90 is operatively connected to the sensor connector 68. Thus, the sensors 58, 60, 62, 64, 66 are able to relay sensor signals to the control units 108, 110, 112, 114 through the sensor wires 70, 72, 74, 76, 78, the sensor connector 68, the sensor connector port 90, and the sensor connector port connector wires 100, 102, 104, 106.

As depicted in FIG. 4, the load-bearing vehicle retention coupling 32 is operatively connected to the wheel module retention coupling 86. In FIG. 4, the operative connection is fixed; however, the invention contemplates other types of operative connections capable of bearing vehicle load forces. Thus, the second structural unit 80 is rigidly mounted with respect to the frame 82. This may minimize unsprung mass as the weight of the actuators 36, 46, 48 and of the control signal receiver 38 and the sensor connector 68 are axially inward of the suspension system 28. Although FIGS. 1-4 depict embodiments of wheel modules having a motor, a wheel module may have no motor. The chassis 81 is attached to the wheel module 2 only through the vehicle attachment interface 84. The vehicle attachment interface 84 includes only the control signal receiver 38 and the load-bearing vehicle retention coupling 32 and is characterized by an absence of mechanical control linkages. This simple attachment configuration may aid in assembly efficiency.

Figure 5:
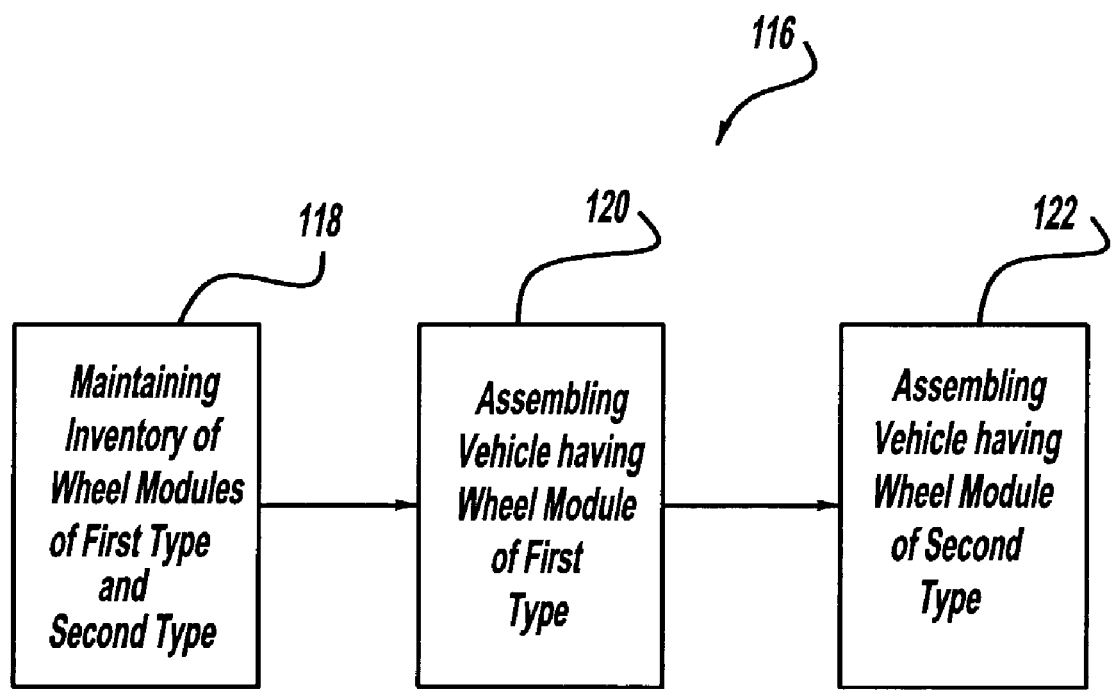
FIG. 5 is a flow diagram illustrating a process of assembling a drivable vehicle using different types of wheel modules in accordance with the invention.

A multiple step process for manufacturing a drivable vehicle is also contemplated. One embodiment of this process 116 is depicted in FIG. 5. One step of the process 116 is maintaining an inventory of wheel modules of a first type and of a second type 118. The wheel module of the first type would include all of the elements of the wheel module described in claim 1:

at least one non-rotating structural unit, a rotatable wheel controllably connected to said at least one non-rotating structural unit, a vehicle attachment interface that includes a load-bearing retention coupling and a control signal receiver and that is operatively connected to said at least one non-rotating structural unit, and chassis components including at least one of a brake system, steering system, motor and suspension system operatively connected to said at least one non-rotating structural unit and to the wheel, and operatively connected to the control signal receiver for controlling the wheel in response to non-mechanical control signals received through the control signal receiver.

The wheel module of the second type would also include all of the elements of claim 1. However, in the process 116, the wheel module of the first type includes chassis components configured to provide a different-function-than the chassis components of the wheel module of the second type. For example, the wheel module of the first type may include a steering system while the wheel module of the second type has no steering system.

Another step of the process 116 is assembling a first drivable vehicle having a wheel module of the first type selected from the inventory 120. The assembling includes attaching the vehicle chassis, described above with respect to FIG. 4, to the wheel module by operatively connecting the control signal receiver with the control signal connector port and the load bearing vehicle retention coupling with the load-bearing module retention coupling such that the control units on the vehicle are operatively connected to and control the chassis components on the wheel module, as discussed above.

Another step of the process 116 is assembling a second drivable vehicle having a wheel module of the second type selected from the inventory 122. Because the wheel module of the first type has chassis components configured to provide a different function than the chassis components of the wheel module of the second type, the first drivable vehicle will have a different wheel module configuration than the second drivable vehicle. This would include the first drivable vehicle having four-wheel drive (a module at each of four wheels, each module having a motor as a chassis component) and the second drivable vehicle having two-wheel drive (a module with a motor at only two of the wheels). The first drivable vehicle could have four-wheel steering and the second drivable vehicle could have two-wheel steering. The versatility of the wheel module chassis components results in a multitude of different potential drivable vehicles.

Accordingly, the wheel module depicted in FIG. 2 includes at least one non-rotating structural unit, the motor housing 26, a rotatable wheel 4 controllably connected to the motor housing 26, a vehicle attachment interface 42 that includes a load-bearing retention coupling 32 and a control signal receiver 38 and that is operatively connected to the-motor-housing 26, and chassis components including a brake system 9, steering system 44, motor 50 and a suspension system 28, each of which is operatively connected to the motor housing 26, to the wheel 4 and to the control signal receiver 38, and responsive to non-mechanical control signals, as set forth by claim 1. The wheel module 2 may include only one chassis component or all four, allowing for a broad range of vehicle configurations when different wheel modules 2 are operatively connected to the vehicle chassis 81 depicted in FIG. 4.

While the best modes for carrying out the invention have been described in detail, those familiar with the art to which this invention relates will recognize various alternative designs and embodiments for practicing the invention within the scope of the appended claims.

The invention claimed is:

1. A wheel module for a vehicle comprising:
   at least one non-rotating structural unit;
   a rotatable wheel controllably connected to said at least one non-rotating structural unit;
   a vehicle attachment interface operatively connected to said at least one non-rotating structural unit, the vehicle attachment interface including a load-bearing vehicle retention coupling and a control signal receiver;
   chassis components including suspension system operatively connected to said at least one non-rotating structural unit and to the wheel, and operatively connected to the control signal receiver for controlling the wheel in response to non-mechanical control signals received through the control signal receiver;
   wherein said at least one non-rotating structural unit includes a motor housing and a second non-rotating structural unit located axially inward of said suspension system; and
   wherein said vehicle attachment interface is mounted with respect to said second structural unit.

2. The wheel module of claim 1 further comprising:
   a sensor operatively connected to at least one of the wheel and the chassis components, and capable of sensing a component condition; and
   wherein the vehicle attachment interface includes a sensor connector operatively connected to the sensor.

3. The wheel module of claim 1, wherein said chassis components include a brake system, a steering system, and a motor.

4. The wheel module of claim 1, further comprising an actuator operatively connected to the chassis components and to the control signal receiver and configured to convert an electrical control signal into a mechanical force that acts on the chassis components.

5. The wheel module of claim 4 wherein the actuator is operatively connected to the non-rotating structural unit.

6. The wheel module of claim 1 wherein the wheel module is operably connectable to a vehicle by only the vehicle attachment interface, and wherein the vehicle attachment interface is characterized by the absence of mechanical control linkages.

7. The wheel module of claim 1, further comprising:
   a sensor operatively connected to at least one of the wheel and the chassis components, and capable of sensing a component condition; and
   wherein the vehicle attachment interface includes a sensor connector operatively connected to the sensor.

8. A drivable vehicle comprising:
   a wheel module including:
      at least one non-rotating structural unit;
      a rotatable wheel controllably connected to said at least one non-rotating structural unit;
      a vehicle attachment interface operatively connected to said at least one non-rotating structural unit, the vehicle attachment interface including a load-bearing vehicle retention coupling and a control signal receiver; and
      chassis components including at least one of a brake system, steering system, motor and suspension system operatively connected to said at least one non-rotating structural unit and to the wheel, and operatively connected to the control signal receiver for controlling the wheel in response to non-mechanical control signals received through the control signal receiver; and
   a vehicle chassis including a frame, at least one control unit operatively connected to the chassis components, a wheel module attachment interface including a control signal connector port and a load-bearing wheel module retention coupling operatively connected to the frame, wherein said at least one control unit is operatively connected to the control signal connector port;
   wherein the control signal receiver is operatively connected to the control signal connector port such that said at least one control unit is communicable with and controls the chassis components, and the load-bearing vehicle retention coupling is operatively connected to the load-bearing wheel module retention coupling.

9. The drivable vehicle of claim 8 wherein the wheel module is operatively connected to the vehicle chassis by only the vehicle attachment interface and the wheel module attachment interface, and wherein the vehicle attachment interface is characterized by an absence of mechanical control linkages.

* * * * *